(12) United States Patent
Quintero et al.

(10) Patent No.: US 6,910,071 B2
(45) Date of Patent: Jun. 21, 2005

(54) SURVEILLANCE MONITORING AND AUTOMATED REPORTING METHOD FOR DETECTING DATA CHANGES

(75) Inventors: Andrew H. Quintero, Sunnyvale, CA (US); Jeffrey S. Fedor, Redondo Beach, CA (US); Alan G. Quan, Glendale, CA (US); Karen Richardson, Arcadia, CA (US); Donald W. Scott, Lake Forest, CA (US); Ken A. Piper, Long Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 807 days.

(21) Appl. No.: 09/824,340

(22) Filed: Apr. 2, 2001

(65) Prior Publication Data

US 2002/0143932 A1 Oct. 3, 2002

(51) Int. Cl.⁷ .............................................. G06F 15/173
(52) U.S. Cl. ..................... 709/224; 709/228; 709/223; 709/220; 709/231; 715/503; 703/26
(58) Field of Search ................................. 709/228, 223, 709/220, 231, 224; 715/503; 703/26

(56) References Cited

U.S. PATENT DOCUMENTS 6,640,249 B1 * 10/2003 Bowman-Amuah ......... 709/228

* cited by examiner

Primary Examiner—William A. Cuchlinski, Jr.
Assistant Examiner—Thanh T. Nguyen
(74) Attorney, Agent, or Firm—Derrick Michael Reid

(57) ABSTRACT

A surveillance monitoring and automated reporting method is used for detecting observable changes in data sources over a network, such as the internet, for accessing changing data, such as world wide web content data, and for providing scheduled change detection notifications and results through user defined search criteria for automated monitored search criteria matches on a recurring basis by user defined scheduling. The method extracts content data from the data sources and updates a master database, then detects changes in the content data within the search criteria. Upon detection, the user is notified using graphical interfaces, electronic mail messages, pager messages, or personal data assistant messages.

17 Claims, 7 Drawing Sheets

MONITORED DISTRIBUTED NETWORK

MONITORED DISTRIBUTED NETWORK

NETWORK CONNECTED MONITORING
AND REPORTING SYSTEM

```
101  TOP LEVEL:
102
103  BEGIN
104
105  Update database: set the run flag of this daemon to TRUE;
106  Create an empty list V for link storage;
107  Set boolean Flag to TRUE;
108  While Flag is TRUE:
109  {
110      Get the user's URL, search interval SI, and depth Depth;
111
112      Do searchURL(URL, Depth, 0);
113      Get the value of the start-stop flag for this daemon from
114          the database and assign it to Flag;
115      If Flag is TRUE:
116      {
117          Sleep for SI * 60 seconds;
118          Get the value of the start-stop flag for this daemon
119              and assign it to Flag;
120      }
121  }
122  Update database: set the run flag of this daemon to FALSE;
123
124  END TOP LEVEL
125
126
127
```

SURVEILLANCE DAEMON

FIG. 3

```
128  SUBROUTINE searchURL(URL, Depth, Level)
129
130  BEGIN
131
132  Create an empty list L for link storage;
133  Open two files for writing, an HTML file, and a formatted
134      text file (FT file);
135  Create a socket connection to the URL;
136  Request the HTML from the URL, one character at a time;
137  While there is still more data to read from the socket:
138  {
139      For each character returned from the URL:
140      {
141          Write the character to the HTML file;
142          If the character is the beginning of an HTML tag:
143          {
144              Read all characters to the end of the current
145                  tag and store them in a string Tag;
146              Write Tag to the HTML file;
147              If Tag is a link to another URL:
148              {
149                  Add the link to list L;
150              }
151          }
152          Else
153          {
154
155              Write the character to the FT file;
156          }
157      }
158  }
159
160  Convert the text in the FT file to one string FS, with each segment of
161      white space in FT replaced by a single blank in FS;
162
```

SURVEILLANCE DAEMON SUBROUTINE
HTTP CLIENT DATA RETRIEVAL PORTION

FIG. 4A

```
163  If the URL is the top-level URL (i.e., Level = 0)
164
165  {
166          Do changeDetection(URL, FS);
167
168
169
170          If there is a true change in the text:
171          {
172                  Set TrueChange to TRUE;
173                  Add the keyword hit counts generated by
174                      changeDetection() to the database;
175                  Generate an activity report;
176                  Add the report to the database;
177                  Send the report to the user via the user-specified
178                      notification methods (email, pager, and/or PDA);
179          }
180          Else
181          {
182                  Set TrueChange to FALSE;
183          }
184  }
185
186  Else
187  {
188          From the database, get the keywords associated with the
189              original top-level URL;
190          For each keyword W:
191          {
192                  Count the number of occurrences N of W in FS;
193                  Add N to the total keyword count T;
194          }
195          Insert the crawled-to URL, the keyword counts N for each
196              keyword W, and T into the database;
197  }
198
199
```

SURVEILLANCE DAEMON SUBROUTINE
CHANGE DETECTION PORTION

FIG. 4B

```
200    If TrueChange is TRUE OR Level is greater than 0:
201
202    {
203        While List L is not empty:
204        {
205            Remove the first URL link U1 from list L;
206            If Level is less than Depth:
207
208            {
209                If U1 is not in the list V:
210
211                {
212                    If the domain of U1 is identical to the
213                    domain of the original top-level URL:
214                    {
215                        Insert U1 at the end of list V;
216
217
218
219                        Do searchURL(U1,Depth,Level+1);
220                    }
221                }
222            }
223        }
224    }
225
226    END SUBROUTINE
```

SURVEILLANCE DAEMON SUBROUTINE
RECURSION PORTION

FIG. 4C

```
301  SUBROUTINE changeDetection(URL, FS)
302
303
304  BEGIN
305
306  Retreive the formatted text P of the previous version of the URL from
307     the database;
308  If at least one character of FS is different from P:
309  {
310        Replace P in the database with FS;
311        Retrieve the boolean keyword expression Exp associated with
312           URL from the database;
313        Search the new text FS using Exp;
314        If Exp is TRUE in FS:
315        {
316              Get the keywords associated with URL from the database;
317              For each keyword W:
318              {
319                    Count the number of occurrences of W in FS;
320              }
321              Retrieve the keyword counts associated with the
322                 previous version P from the database;
323
324              If at least one keyword count for FS is different from
325                 the corresponding keyword count for the previous
326                 version P:
327              {
328                    A change between pervious version and new
329                       version has been detected;
330              }
331              Else
332              {
333                    No change is detected;
334              }
335        Else
336        {
337              No change is detected;
338        }
339  Else
340  {
341        No change is detected;
342  }
343
344  END SUBROUTINE
```

CHANGE DETECTION SUBROUTINE

FIG. 5

SURVEILLANCE MONITORING AND AUTOMATED REPORTING METHOD FOR DETECTING DATA CHANGES

STATEMENT OF GOVERNMENT INTEREST

The invention was made with Government support under contract No. F04701-93-C-0094 by the Department of the Air Force. The Government has certain rights in the invention.

FIELD OF THE INVENTION

The invention relates to the field of computer monitoring of data changes. More particularly, the present invention relates to surveillance monitoring and automated reporting of detecting changes in monitored data well suited for reporting detected changes in internet websites content data.

BACKGROUND OF THE INVENTION

Electronic storage of information in computerized databases and file servers has all but replaced the traditional library as a data source of recording knowledge. Modernly, a user provides locating information about the subject matter of interest to be found in an information source. This locating information would include knowledge about the author, title, publication date, or keywords that might appear in a written abstract about the information source. The locating information describes something about the information source, and is commonly referred to as the meta data. Historically, the written word was the primary medium found in books, newspapers, magazines and other periodicals. Modernly, the types of media for recording data have expanded to include magnetic tape, photography, video tape, digital books, computer generated reports, digital audio, digital video, computerized data bases, and internet web pages. Computer based indices have replaced card catalogs as the preferred means for locating various information sources. Most of the newly recorded data is available in electronic form and available via networked computers.

Networked computers enable rapid data sharing. The network connection can be made with optical connections, copper wire connections, or can be wireless. The networks can be localized intranets referred to as local area networks. Networks can also include many external computers distributed over a wide physical area as an internet, referred to as wide area networks. To share data information, the networked computers use compatible communications protocols. The most common protocol includes hypertext transport protocol (HTTP), that uses transmission control communication protocol internet protocol (TCP/IP). The largest and most common collection of networked computers is the internet. HTTP is the protocol that is used on the world wide web (WWW) that utilizes the hypertext markup language (HTML) to format and display text, audio, and video data from a data source most often using a WWW browser. The most common method to display information communicated through the WWW is in the form of HTML web pages.

To view web content data of a particular web page requires a reference to the location of the web page. The web page content data is stored electronically in memory storage devices of a web server. The servers have web domain name addresses to enable retrieval of the information from the local storage. If the desired web content data is on the internet, the web server storing the desired web content data must first be identified. On the internet, computers utilize an internet protocol address (IPA) unique to each web server system. Because numbers are difficult for humans to remember, alias names are used in lieu of the IPA. These alias names are commonly referred to as domain names. A domain name service (DNS) keeps track of which IPAs are represented by the respective domain names. Once a domain name is known, a user can specify the exact directory path to the file of interest containing the desired web content data by specifying the complete domain name and the directories path using a uniform resource locator (URLs) on the web.

To locate desired web content data at a particular URL, the user would either be required to specify the exact URL and then manually review the document, or perform a search based on some search criteria. The most common search method employed is through the use of web based search engines. Search engines typically use key words in Boolean combinations to specify search criteria. Boolean combined keyword searches are routinely used by users and provide users with a simple and convenient way of searching for desired web content data. However, Boolean combined keyword searches using search engines often produce millions of URL locations with many nonrelevant web pages pointing to nonrelevant web content data as part of the search result. A search engine match result is also referred to as hit, whether it is relevant or not to the requester. A user often has to manually review many nonrelevant search hits in order to locate relevant search hits. Additionally, typical Boolean combined keyword searches do not provide users with a convenient means to routinely search web pages linked to web page hits. Human review of data is most effective at determining if the source of information is appropriate for required needs, but humans often lack time to perform recurring searches for desired data. While a one time search may be executed by a user, users often have to disadvantageously repeat the identical search process, for example, on a daily basis, in order to monitor changes in web content data. Web based search engines do not provide a means to perform automated routine searches based upon user defined search criteria. These and other disadvantages are solved or reduced using the invention.

SUMMARY OF THE INVENTION

An object of the invention is to provide a method for routinely searching over a network for changes in data content.

Another object of the invention is to provide a method for routinely searching data sources over a network for changes in data content within defined search criteria.

Yet another object of the invention is to provide a method for routine notification of changes in data content of networked data sources having data content within defined search criteria.

Still another object of the invention is to provide a method for routine notification of changes in data content of data sources connected over a network.

A further object of the invention is to provide a method for routine identification of changes in data content of networked data sources identified by search criteria and having data content also identified by the search criteria.

Yet a further object of the invention is to provide a method for routine identification of linked data sources having data content within defined search criteria.

Still a further object of the invention is provide a method for routine notification of changes in data content of linked data sources having changed data content within defined search criteria.

The invention is directed to a method for monitoring networked data sources for changes in data content within defined search criteria and provides users with notification of those changes. The invention is applicable to both web based services and networked systems for providing computer program processes that search for changes in content data. The searches include conventional Boolean combined keyword searches. During web based monitoring, the method monitors changes data of user specified data sources that match the search criteria. The data sources can be web servers identified by uniform resource locators (URLs). The content data can be web content data also identified by the URLs. As a stand alone process executed on a networked computer of a user, the method monitors other network data sources, such as other networked computers, for changes in the data content of the search defined data sources. For web based services, users may be given an account where the users specify a list of information sources, some of which may be in the form of web pages identified by the (URLs) to be monitored and specify associated keywords, or other more complex criteria, that are of a particular interest to the users. The method is well suited for website searches. A URL is used to specify a website with the URL having a http:// scheme, and having a domain name for locating the website. The content data sought at the website can be identified by the path extension of the URL. In the general case of any networked system, a uniform resource identifier could be used to identify the data source, and extensions for identifying the sought after content data.

In the case of web monitoring, a user interface to the web is the user web browser that provides the URLs pointing to websites and web content data to be searched and monitored. The user selects how often each specified URL, or other networked data source, is to be monitored for changes. The user may also select the methods of detected change notification such as electronic mail, personal digital assistant, pager, or a near real time graphical status display. The user can specify a crawling depth of intradomain hyperlinks that the service will search for occurrence of keywords and selection criteria. The invention preferably uses a web server with interfaces to a database, software programs, common gateway interfaces, and java programs having servlets with a java server. For the stand alone software process, the web based service functions are implemented on a user computer. In the broad form of the invention, the method monitors any networked data source and networked content data in databases and file systems, as well as monitoring websites storing web content data.

In the preferred form, the method provides a web based service using a dedicated web server that monitors changes in user specified website content data. The method is preferably implemented using the world wide web with communications over the internet. Users may be given an account number for tracking user searches. The users may specify a list of web pages by respective uniform resource locators (URLs) of the web pages to be monitored with associated keywords of interest for each URL. The user interface to the monitoring web server is the user web browser that points to the URL of a monitoring web server. After login into the monitoring web server, the user can then provide the search criteria and the frequency of the searches for each specified URL that is then checked for sampled for changes. The detected change notification can be by way of electronic mail, pager, or a near real-time graphical status display. The user can specify the crawling depth of intradomain hyperlinks that will be searched for occurrence of the specified keywords. The method preferably uses a web server such as an apache web server that interfaces to a database while executing C programs, common gateway interfaces and java programs.

The method provides automatic recurring notification of search result for any user that desires to stay as current as possible of changing data. Web tools can be used to repetitively locate networked content data with an ability to continuously monitor information sources for updates, or changes, in the content data of only pertinent information within the specified search criteria. The method monitor changes of the web content data that are of particular interest to the user on a recurring basis specified by the user.

The method preferably provides a service website to the user to allow the user to select URLs and corresponding keywords for each URL, the crawling depth to which links will be followed for keyword searching, the frequency of checking for each URL expressed in minutes, hours, or days, the electronic mail, pager, or personal digital assistant addresses to which notification reports will be sent, the category to which the URL will be assigned, and the keyword Boolean expression that will be used to search the web pages. The Boolean expression allows keywords to be joined with AND and OR operators. Once the URL and its parameters are defined, the user then can launch or terminate the search and detection process for each specified URL through the internet.

The search and detection software is implemented as a search daemon that runs as an independent background process on the host machine that is preferably a web server. As soon as a search daemon is launched, the search daemon follows a predetermined search procedure. A network connection is established to the user specified URL that is to be monitored. A web request is sent over the internet to download the HTML from the URL. All the characters sent in response to the URL request are saved in a file. In addition, a second text only file is created that contains the formatted version of the text without HTML tags. To create this file, while the characters are being received from the data source, any text that is part of an HTML tag is not written to the text only file. All other text characters are written to the file. Thus, after all the HTML data is received for the URL, the text only file contains all the text from the URL minus the HTML tags. During the HTML acquisition, a list of all URL links that appear in the web page is created for crawling through linked pages to the specified crawling depth for determining if the linked pages also match the specified search criteria.

Changes are detected based on a comparison of the previous text data only version of the web page stored in the database with the newly downloaded text only version of the page, both with duplicative white spaces firstly removed. The new formatted text is compared to the formatted text of the previous version for determining changes in the number of keyword hits matching the Boolean search criteria. If the current and previous text version do not match then further comparison is required in order to avoid reporting of trivial changes that the user would not be interested in. The keyword counts for the new page are determined. If any one of the keyword counts for the new page differs from the corresponding keyword count for the previous version, then a change is declared between the current and previous text only versions. After the initial comparison between the previous version in the database and the new current version is done, the previous version of the page in the database is replaced by the formatted text of the new current version. In this manner, relevant sought after changes are detected. The change detection is repeated as often as the specified search frequency. After each detection of a change in the keyword counts, the user is notified. In this manner, the monitoring method continually searches the content data for changes with automatic reporting to the user. These and other advantages will become more apparent from the following detailed description of the preferred embodiment.

BRIEF DESCRIPTION OF THE DRAWINGS

FIG. 3 lists a top level portion of a surveillance daemon.

FIG. 4A lists a pseudocode for an HTTP client data retrieval portion of a surveillance daemon subroutine.

FIG. 4B lists a pseudocode for a change detection portion of the surveillance daemon subroutine.

FIG. 4C lists a pseudocode for a recursion portion of the surveillance daemon subroutine.

FIG. 5 lists a pseudocode for a change detection subroutine.

DETAILED DESCRIPTION OF THE PREFERRED EMBODIMENT

Figure 1:
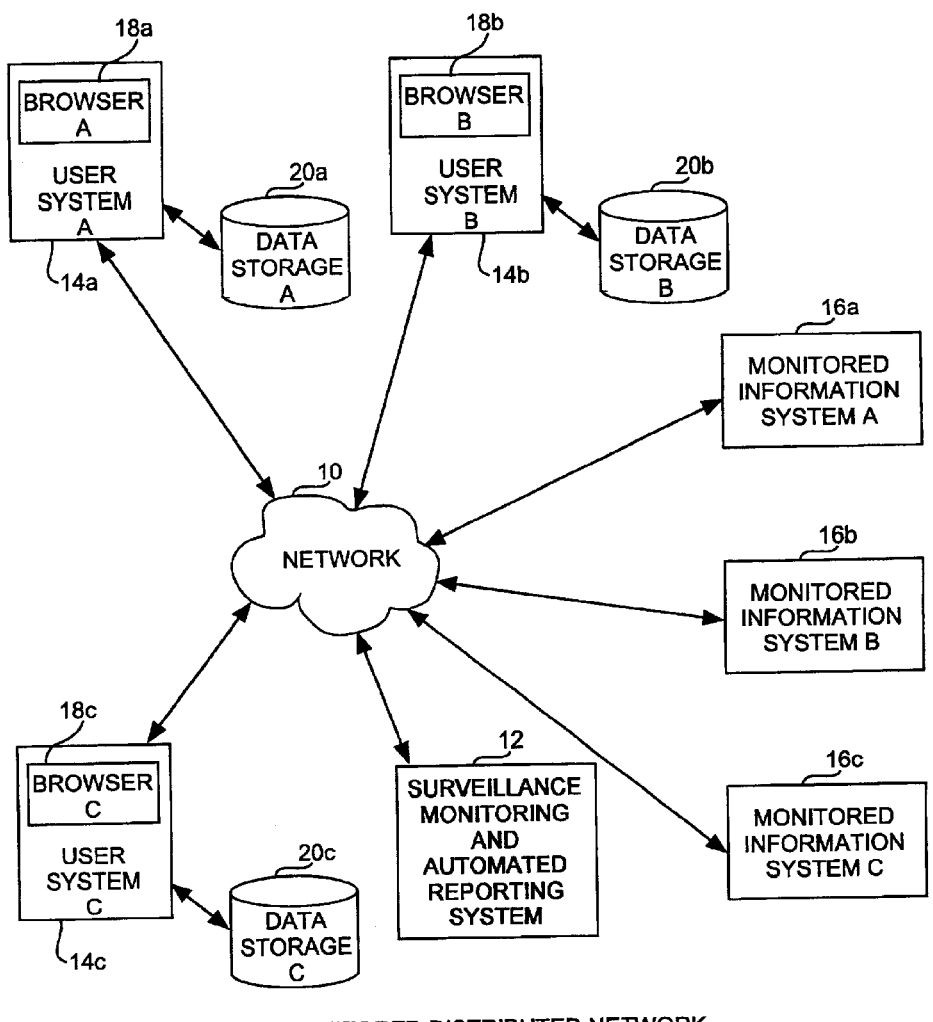
FIG. 1 is a block diagram of a monitored distributed network.
Figure 2:
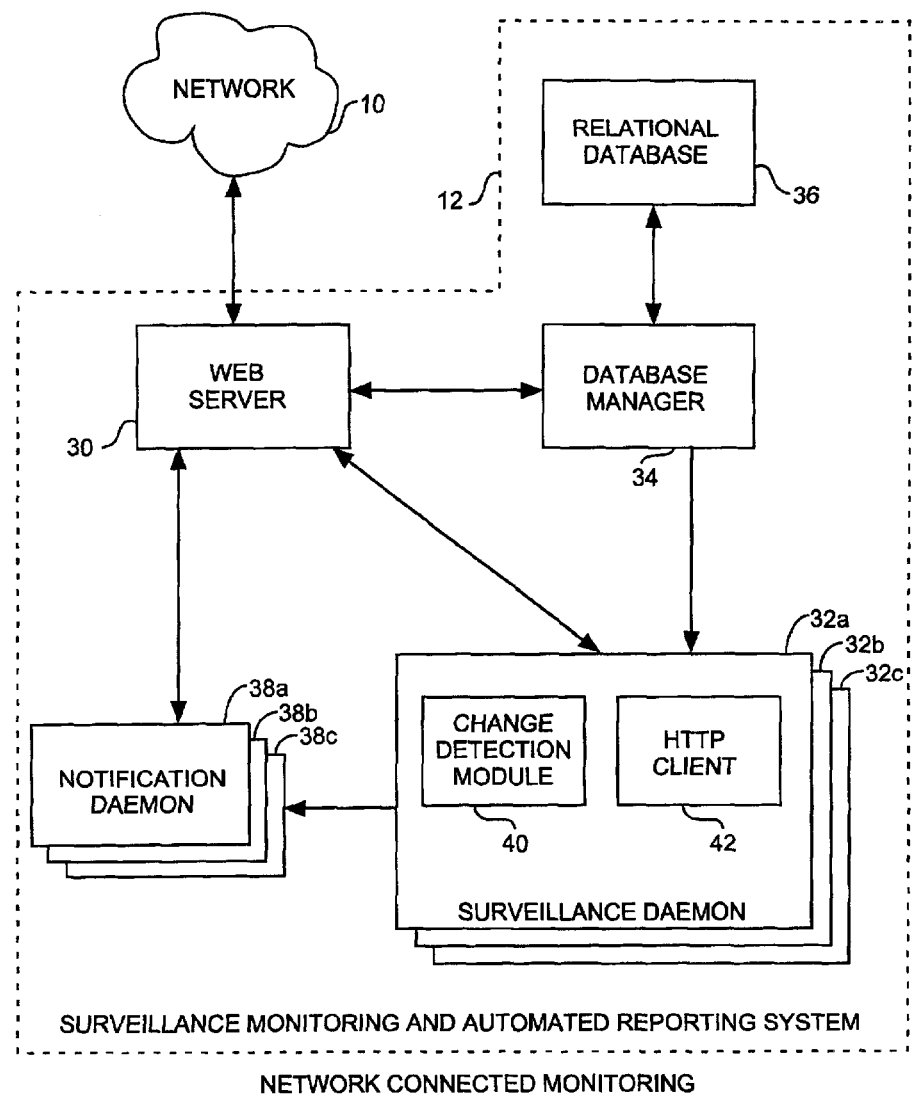
FIG. 2 is a block diagram of a network connected monitoring and reporting system.

An embodiment of the invention is described with reference to the figures using reference designations as shown in the figures. Referring to FIGS. 1 and 2, a monitoring distributive network 10, that is preferably the internet, provides interconnection between a surveillance monitoring and automated reporting system 12 simply also referred to as the monitoring system, and plurality of A, B, and C user systems 14a, 14b, and 14c respectively, collectively simply also referred to as users, and a plurality of distributed networked A, B, and C monitored computer systems, 16a, 16b, 16c respectively, and collectively simply also referred to as monitored systems. The networked distributed computer systems 16a, 16b and 16c are preferably websites, but may generally be file systems, databases, and/or local file systems connected to the network 10. The monitored systems 16a, 16b, and 16c are monitored by the monitoring system 12. The user computers 14a, 14b, and 14c connect to the monitoring system 12 and the monitored systems 16a, 16b and 16c through the network 10. The user systems 14a, 14b, and 14c respectively include an A browser 18a, a B browser 18b, and a C Browser 18c, with respective data storage 20a, 20b, and 20c that are typically local disk storage devices of user systems 14a, 14b, and 14c.

The monitored distributed network 10 can be a network of varying configurations, and can be, for example a private local area network, a wide area network, or a public network, such as the internet. The user systems 14a, 14b, and 14c can be workstations, personal computers, or larger mainframe computer systems. Each user computer 14a, 14b, and 14c typically includes one or more processors, memories, and input/output devices, all well known but not shown. The browsers 18a, 18b, and 18c are communication interfaces to the network 10 when the monitoring system 12 is particularly adapted for website communications for monitoring websites that may be the monitored web server systems 16a, 16b and 16b, though other types of communication interfaces and information systems may be used. The browser 18a, 18b, and 18c are preferably particularly programmed for searching, sending and receiving web content data for websites of the web servers 16a, 16b and 16c located by internet protocol addresses (IPAs) on the internet.

The network 10 allows interconnection to a vast array of connected computer systems. The monitored systems 16a, 16b, and 16c are typically information storage systems but are preferably website servers having respective uniform resource locators (URLs) and respectively storing URL identified web content data over the world wide web (WWW). The user systems 14a, 14b, and 14c access the web based monitoring service of the monitoring system 12 preferably using the web browsers 18a, 18b, and 18c. Although the monitoring system 12 generally focuses on monitoring information systems, such systems are preferably WWW website server systems. However, the monitoring system 12 can also be used for monitoring information through other wide or local area networks, or information stored in any distal computer system using specific networking communications protocols when communicating through the network 10.

Referring to all of the Figures, the monitoring system 12 is preferably a website server computer system for communicating over the internet when the network 10 is the internet and when the monitored information systems 16a, 16b, and 16c are website servers storing URL specific web content data. In the preferred form, the monitoring system 12 is a web based server system including a front end web server 30 for communicating over the internet network 10 using URLs for defining web content data and IPAs for defining website internet network address locations. The monitoring system can launch and concurrently execute a plurality of surveillance daemons, such as surveillance daemons 32a, 32b, and 32c interfacing with a database manager 34 managing a relational database 36. The top level pseudocode for the surveillance daemon is listed in FIG. 3. Preferably, each of the surveillance daemon 32a, 32b and 32c concurrently communicate with a respective notification daemon 38a, 38b and 38c. Each pair of surveillance daemon and notification daemon respectively operates in combination to respond to user monitoring requests and provide notification of the monitoring results. User system 14a, 14b, and 14c, using respective browser 18a, 18b, and 18c provide the monitoring system 12 with respective search criteria, in response to which, the monitoring system 12 would invoke respective surveillance daemons 32a, 32b, and 32c, and respective notification daemons 38a, 38b, and 38c during the monitoring process.

The monitoring system 12 preferably includes the HTTP web server 30, the database manager 34, the relational database 36, and one or more active surveillance daemons 32a, 32b and 32c, and one or more respective notification daemons 38a, 38b and 38c, each particularly configured for web communication using URLs and IPAs over the internet network 10. The notification daemons can include sending notification of changes in web content data through electronic mail, preferably through the internet, but may also include communication through wireless devices including personal digital assistants, pagers and cell phones, and a near real-time graphical display of information source detected changes. The automated web browsers 42 of the surveillance daemons 32a, 32b, and 32c, function to respectively communicate with the monitored web information systems 16a, 16b, and 16c, during searching as the change detection module 40 of the respective surveillance daemon 32a, 32b and 32c function to detect change in the specified web content data. The surveillance daemon includes change detection and searching algorithms using a website monitoring code that is implemented as a software module. The notification daemons 38a, 38b, and 38c function to respectively communicate with the user systems 14a, 14b, and 14c during notification of monitoring results. Each of the surveillance daemons 32a, 32b and 32c are invoked by launching the top level pseudocode of FIG. 3 that can preferably launch respective surveillance daemon subroutines of the respective pseudocode listed in FIGS. 4A, 4B, and 4C. The surveillance daemons 32a, 32b and 32c include respective HTTP client modules 42 when executing the HTTP client portion of FIG. 4A of the surveillance subroutine, and have respective change detection modules 40 when executing the change detection portion of FIG. 4B of the subroutine that in turn uses the recursion portion of FIG. 4C and the change detection subroutine of FIG. 5. The HTTP client 42 can be implemented as an automated web browser. The change detection module 40 and the HTTP client module 42 operate in combination during monitoring with the HTTP client module fetching web pages within search criteria and with the change detection module determining changes in the fetched web pages.

The surveillance daemon of FIG. 3 is implemented as a top level pseudocode algorithm for performing basic monitoring functions. Each set of user specified search criteria is associated with an invoked surveillance daemon 32a 32b, or 32c at line 101. Whenever the user 14a, 14b or 14c invokes a search on the search criteria, a START/STOP flag in the database 36 for that search criteria is set to TRUE indicating that the surveillance daemon 32 has been launched for those search criteria in the monitoring system 12. A RUN flag in the database 36 indicates whether the surveillance daemon 32 for the search criteria is currently running. When the surveillance daemon is started at line 100 and begins execution at line 103, the surveillance daemon first sets at line 105 the RUN flag to be TRUE. The surveillance daemon 32 then creates a global list V at line 106 to store links that have been visited during link traversal. At line 107 the surveillance daemon sets a GO flag and then enters a search loop at line 108 and extending to line 121 and continues to execute the search loop until the surveillance daemon detects that the START/STOP flag has been set to FALSE. Inside the search loop between lines 108 and 121, the surveillance daemon retrieves user specified information at line 110 from the database 36 specifying a top level URL, a time duration between searches, and a crawling depth. Next, the surveillance daemon calls at line 112 the surveillance daemon SearchURL subroutine of FIGS. 4A, 4B and 4C, with the top level URL, the crawling depth information, and the current crawling level being passed as arguments to the surveillance daemon SearchURL subroutine.

During surveillance daemon subroutine calls, links of the top level URL are searched during link crawling and process control of the subroutine terminates and process control returns to surveillance daemon at line 113. At line 113, the surveillance daemon checks the value of the START/STOP flag. If the START/STOP flag is still TRUE at line 115, then the surveillance daemon 32 sleeps at line 117 for the time duration specified by the user as the interval between searches. Upon waking at lines 118 and 119, the surveillance daemon 32 checks the value of the START/STOP flag again at line 108. If the START/STOP flag is still true at line 108, then the search loop starting at line 109 is executed again. This search loop is repetitively executed at a frequency determined by the time duration intervals that allow the surveillance daemon to run continuously, checking the top level URL for changes at the frequency specified by the user specified time duration. If the START/STOP flag is false at line 108 when the surveillance daemon awakes, then the run flag is set to FALSE at line 122 and the surveillance daemon terminates execution at line 124.

The surveillance daemon 32 of top level pseudocode of FIG. 3 calls the HTTP portion of the surveillance daemon subroutine at line 112 to start execution at line 128 of the HTTP client portion. At line 128, the HTTP client portion is referenced as a subroutine SearchURL and begins at line 130. At line 132 a link list L is created to store all HTML links that are contained in a page specified by the top level URL and linked URLs. There are two files that are created during the processing of the content data of a top level or linked URL. A first HTML file stored in the monitoring system 12 receives all of the characters that are returned over the network through a network socket of the monitored website specified by the top level or linked URL. The network socket connection is created at line 135 to the website corresponding to the top level URL or linked URL to receive the HTML web content data in a buffer that forwards one character at a time through a character retrieval loop of lines 139 through 157 of the HTTP client portion to the HTML file stored in the monitoring system 12. The entire HTML file is transferred at line 141 from the buffer during a retrieval loop line 137 through line 158. A second formatted text file receives the text returned from the top level or linked URL with the HTML tags stripped out between lines 142 through 156. The formatted text (FT) file is created one character at a time at lines 154 and 155. Each HTML web content data character is transferred through the buffer to the HTML file unconditionally at line 141. If the character is not part of an HTML tag at line 142, then the character is also written to the formatted text file at line 155. In order to know whether a given character is within an HTML tag, a check at line 142 is done on each character to see if the character marks the beginning of a HTML tag. If the character marks the beginning of an HTML tag, then web content data characters are read from the buffer until the end of the HTML tag is found. These tag characters are written to the HTML file at line 146 but not to the formatted text file. The HTML tag characters are then examined at line 147 to determine if the HTML tag is a link to a linked URL. If the HTML tag characters are a link to a linked URL, then the linked URL is extracted from the HTML tag characters and added to the end of the link list L at line 149. If the HTML tag characters are not a link, then the HTML tag characters form an HTML tag and are ignored. The process of reading and examining HTML web content data characters is continued by the loop lines 139 through 157 until all of the web content characters are processed for the URL, at which time the buffer is empty and the network socket is closed. The HTML file is retained as a complete record in the monitoring system 12 as an exact HTML copy of the web content data for the URL. The formatted text file is used for all further processing by the surveillance daemon.

The formatted text file is processed in the monitoring system one character at a time and stored as a single large formatted string. During formatted text file processing, the formatted text is formatted to eliminate excess white space at lines 160 and 161. Each character that is not a white space character is appended to the end of the formatted text string. Each contiguous segment of white spaces in the formatted text file is converted to a single blank character and then appended in order at line 160 to formatted text string FS.

After creating the resulting formatted text string of the pseudocode of FIG. 4A, a change detection algorithm of FIG. 4B is called to determine if the formatted text string has changed from a previously stored formatted text string. The change detection algorithm of FIG. 4B preferably only checks for change detection respecting the web content data of top level URLs at line 163. If the current formatted text string is generated from a top level URL, then a change detection section of lines 166 through 183 is executed. Firstly, the change detection section calls at line 166 the change detection subroutine of FIG. 5. The change detection subroutine of FIG. 5 checks to determine if the formatted text string has changed since the last search of that top level URL, and if so, produces an updated keyword hit count and returns back to the change detection portion at line 170. The change detection portion examines the true or false result of the change detection subroutine at line 170 to determine if the change detection subroutine has determined if there has been a change since the last time that the top level URL web content data formatted text string was formatted and updated in the database 36.

The change detection subroutine of FIG. 5 returns the result of the comparison of the previous and current formatted text strings back to the calling subroutine SearchURL of FIGS. 4A, 4B and 4C. The flag TrueChange is set to TRUE if a significant change was detected at line 172, and if no change was detected, the flag TrueChange is set to FALSE. If a change was detected, then the new keyword counts that were generated by the change detection algorithm are added to the database, replacing the counts from the old previous version P. Then an ASCII activity report is generated at line 175. This ASCII activity report is added to the database at line 176 and sent to the user at line 177 through the notification method that the user has specified to be through either electronic mail, pager, or personal digital assistant. When a true change between the new version and previous version is detected, the results are presented to the user in two different formats to enable change and keyword hit notification. First, an electronic message is created and sent to one or more of the user's electronic mail address, pager, or personal digital assistant depending on what reporting options were chosen. This message is an activity report. The message should indicate that a hit has occurred while specifying URLs, keywords, and the number of respective keyword hits, with an abstract that includes, for example, the ten words before and ten words after each keyword hit. The notification may further request the user to log in to the monitoring system 12 for more search result information. All keyword counts should be shown. A limited number of abstracts from the text may be shown as well. The abstracts may be chosen based on the keywords with the highest frequency of occurrence.

The recursive portion of FIG. 4C of the SearchURL subroutine is executed for each of the URLs in the link list L. The change detection portion jumps to line 186 when the link U1 is not the top level URL, that is, when the level is greater than zero, when processing each U1 link from the link list L. The change detection subroutine of FIG. 5 is executed once for the top level URL at line 166. The top level keyword counts for the top level URL and the reporting to the user between lines 170 and 184 is also executed once when processing the top level URL. The processing of the U1 links in list L between lines 188 and 195 and the recursive portion of FIG. 4C is executed for each of the U1 links in the link list L. During each execution of the SearchURL subroutine for each of the U1 links, the SearchURL subroutine determines the number of N occurrences of each of the W keywords in each of U1 links of the link list L. The N occurrences of the W keywords are found for each link U1 in the link list L during each recursive call to the SearchURL subroutine that includes the recursive portion. The change detection portion between lines 188 and 195 determines the N occurrences of each of the W keywords for each link U1 in the link list L. The W keywords are extracted from the database at line 188. The W keywords are those associated with the top level URL. The N number of occurrences of each of the W keywords in the U1 links are determined and added to the total count T at lines 190 through 194. For each of the W keywords at line 190, the N occurrences of the keyword is counted at line 192 to accumulate the total T keyword count for all of the W keywords for each of the U1 links. The N occurrences for each of the W keywords is added to the total number of keywords hits T at line 193. When the keyword counting is complete, T is the total number of occurrences of all of the W keywords in the respective U1 link being processed. The total keyword count T, the keyword occurrence count N for each of the W keywords, and the crawled-to URL, that is the current U1 link, are updated in the database at line 195. The U1 link and the respective T total count for all of the W keywords contained in the U1 link are inserted into the database for later display and reporting.

The recursion algorithm of FIG. 4C is a link traversal algorithm. If flag TrueChange is TRUE at line 200, then the SearchURL subroutine will attempt to traverse any links that are in the page specified by the URL. All of these links are contained in the previously created list L at line 149. A recursive loop at line 203 examines each link in list L starting at the beginning of the list and first determines if the list L is empty. If the link list is not empty, then the first link U1 is removed from the list at line 205. A check is done at line 206 to determine if the current link level is greater than or equal to the maximum crawling depth for link traversal that was specified by the user. When processing the top level URL, the link level is zero. If link level is less than the maximum crawling depth at line 206, then the link is checked to see if the link has already been processed by checking if the link U1 is in the list V of visited links at line 209. If link U1 is not in the list V, then the domain of U1 is determined at lines 212 and 213. If the domain of link U1 matches the domain of the original top level URL at line 212, then the link U1 is eligible to be searched for keywords and for other links, and in so doing, the link U1 will become traversed. Only links with the same domain are searched in order to avoid unacceptably large link search trees. The link U1 is added to list V at line 215 to show that the link has been processed. A recursive call to the SearchURL subroutine is performed at line 219 with arguments of link U1 as the URL, crawling depth, and link level plus one because the processing is progressing down one level in link traversal. The recursion portion of the SearchURL subroutine recursively calls the SearchURL subroutine for each of the URLs in the link list L.

The recursive portion of the SearchURL subroutine of FIG. 4C, is executed at line 200 when the link level is greater than zero indicating a U1 linked URL is being processed. At this point the link list L contains all the links contained within the page specified by URL U1. The URL, which may be the top level URL or a linked URL, is examined at line 163. When the URL is a linked URL, processing jumps to lines 188 through 195 to count the keywords in the linked URL. During a first execution of the SearchURL subroutine, when processing the top level URL, change detection is performed and keywords are counted between lines 166 and 183. After processing the top level URL, the recursion portion first determines that there has been a true keyword change or that processing is not at the top level URL of zero so that the links can be processed at line 200. When the link list L is not empty, and the first URL of the link list L is removed at line 205, the removed U1 link is then processed. If the crawling depth of the removed link has a depth less than the user specified depth at line 206, the removed link is compared to the domain of the top level URL at lines 212 and 213. If the current depth level of the removed link is less than the user specified depth, and the removed URL has the same domain as the top level URL, and the URL is not in the visited list V, then another recursive call to SearchURL is initiated for processing the link in the link list L. This recursive process continues in the loop between lines 203 to 223 until all the links in the link list L have been checked. During each loop between lines 203 and 223, the SearchURL subroutine is recursively called at line 219 to count the keywords between lines 188 and 195. When any link in the link list L generates a set of embedded links, the embedded links are added to the link list when executing the HTTP client data retrieval portion of the SearchURL subroutine of FIG. 4A. All of the links in the link list L are processed by a recursive call of the SearchURL subroutine so that the SearchURL subroutine crawls through each of the links to the specified crawling depth. When the crawl level of the removed link becomes equal to or greater than the specified crawling depth, then the recursive call of the SearchURL subroutine will not be executed. The recursive call allows link traversal to stop when the SearchURL subroutine has reached the user specified crawling depth. After all links in link list L have been processed, the recursive call to SearchURL terminates at line 226 and control is returned to line 113 of the surveillance daemon of FIG. 3.

During execution of the change detection portion of the SearchURL subroutine, the change detection subroutine of FIG. 5 is called at line 166 when processing the top level URL to jump to line 301 of the change detection subroutine. The change detection subroutine determines true changes in the top level URL. The SearchURL subroutine is repeatedly called at time intervals at line 112 to begin initial processing of the URL at the regular intervals of sleep at line 117. During each initial processing of the top level URL, the change detection portion at line 166 jumps to the change detection subroutine at line 301 to begin at line 304 determining when there has been a true change in the top level URL. During repeated monitoring of the top level URL, the text of the URL may be repeatedly updated in the database. At the beginning of each execution of the change detection subroutine, the previous version of the text for the top level URL has been stored in the database as P string. This previously stored P string is retrieved at lines 306 and 307 from the database. The change detection subroutine then makes direct comparison between the P string and the new formatted text string FS at lines 308. If there is at least one character that is different between the P string and FS string, then there may be potential significant difference between the two text versions that must then be processed to determine if there has been a true change. The FS string replaces the P string in the database at line 310 to keep the database current with the text of the top level URL. To determine if there has been a true change, the Boolean keyword expression (Exp) that had been previously specified by the user for the top level URL is retrieved from the database at lines 311 to 312. The FS string is searched at lines 313 for matches with Exp expression. If the expression Exp is found in FS string at line 314 indicating that the W keywords exist in FS in compliance with the Exp Boolean expression, then the W keywords associated with the URL are retrieved from the database at line 316 and then, for each of the W keywords at line 317 a keyword count is executed at line 319 for determining the number of occurrences of each of the W keywords.

The keyword counts for the previous version P string are retrieved from the database at line 321. If at least one keyword count for FS is different from the corresponding keyword count for the same keyword in the P string at line 324, then the change detection subroutine determines at line 328 that a significant difference exists between the previous P string and the new formatted FS string of the text and a true change is declared at line 328. In any other case, between lines 330 and 341, no change is declared. The change detection subroutine ends at line 344 and returns to the change detection portion where the true change is examined at line 170 and the TrueChange flag is either set to TRUE at line 172 or FALSE at line 182. In this manner, the change detection subroutine determines true changes since the last time that the top level URL was visited. After all processing for a particular top level URL is completed, including traversal of all links contained in the top level and lower level pages, the surveillance daemon then sleeps for a sleep period of time equal to the frequency interval that was specified by the user. If the user has chosen to terminate the processing of the surveillance daemon, then the surveillance daemon exits at line 124.

As may now be apparent, the surveillance daemon is used to repeatedly monitor user specified URLs at repeated user specified sleep intervals to a user specified link crawling depth searching for matches and changes in the matches to user specified keywords and keyword Boolean expressions. In the event of a change, the notification daemon provides rapid electronic notification with transmitted data so that the user can view the results. After URL monitoring notification, the user can preferably view details of the search results from a service at a website. An HTML page displaying a format similar to the electronic version can be made available to the user. Preferably a page is provided to view the total keyword counts obtained from searching URL links that were followed from the top level or subsequent lower level pages during link traversal crawling. The near real time graphical status display may consist of two pop up windows that show the user two dimensional or three dimensional graphs that are repeatedly updated, for example, every sixty seconds. The graph may show the number of hits per category and the age of the data. Bars of the graph may be color coded to show aging. The combination of size and color may show the user the activity and the age of the oldest data for that category. Each bar in the graph may be clicked to bring up a new window showing either the category, one day, or one month results depending on which part of the graph is selected. A three dimensional display window may show the user the breakdown of hits and separates the hits into multiple day intervals. As may be apparent, there are many possible formats by which to display search results to the users.

The present invention is directed to monitoring data over a network, and preferably monitors web content data over the world wide web through internet communications using a programmed server that receives user specified search criteria including keywords, Boolean expressions, crawling depths, and sleep periods between searches, and preferably provides the user with automated notifications and website displays of the search results. The monitoring system provides the users with notification of changes in the web content data of selected websites. Those skilled in the art can make enhancements, improvements, and modifications to the invention, and these enhancements, improvements, and modifications may nonetheless fall within the spirit and scope of the following claims.

What is claimed is:

1. A method of monitoring by a monitoring system a data system among a plurality of data systems connected to a user system among a plurality of user systems all of which systems are interconnected through a network, the method comprising the steps of, receiving search criteria from the user system, retrieving content data from the data system, repeating the retrieving step at regular intervals, determining matches for each of the retrieving steps when the content data matches the search criteria at each of the regular intervals, and reporting the matches to the user system wherein, the content data is web content data, the data systems are web servers storing the web content data, the network is the internet, the web server having a web site location identified by a uniform resource locator (URL) that indicates the web content data, the user system comprises a web browser for communication with the monitoring system over the internet, and the monitoring system is a web monitoring server for receiving the search criteria from the user browser and for accessing the web content data of the web server.

2. The method of claim 1 wherein, the search criteria comprises a sleep interval indicating a time duration between the regular intervals.

3. The method of claim 1 wherein, the search criteria indicates keywords, the matches are keywords matches.

4. The method of claim 1 wherein, the search criteria comprises keywords, and the search criteria comprises a Boolean expression, the matching step determines when the content data matches the Boolean expression of the keywords as Boolean keyword matches.

5. The method of claim 1 wherein, content data is a character string comprising text words, the search criteria comprises a sleep interval indicating a time duration between the regular intervals, the search criteria comprises keywords, and the matches are keyword matches to the text words.

6. The method of claim 1 wherein content data is a character string comprising text words and formatting characters and strings of spaces, the search criteria comprises a sleep interval indicating a time duration between the regular intervals and comprises keywords, and the matches are keyword matches to the text words, the method further comprising the steps of, stripping the text words from the character string, the matching step matches the keywords to the text words for keywords matches.

7. The method of claim 6 wherein the stripping step, the character string contain formatting characters that are removed form the character string leaving the text words.

8. The method of claim 1 wherein, content data is a character string comprising text words and formatting characters and strings of spaces, the search criteria comprises a sleep interval indicating a time duration between the regular intervals and comprises keywords and comprises a Boolean expression, and the matches are Boolean keyword matches of the Boolean expression of the keywords to the text words, the matching step matches the Boolean expression of the keywords to the text words for the Boolean keywords matches, the method further comprising the steps of, stripping the text words from the character string into a formatted string, storing the formatted string for each of the retrieval steps when the formatted string has changed since a last one of the retrieval steps, counting the number of keywords in the formatted string for each of the retrieval steps for providing keyword counts, and the reporting step reports for each of the retrieval step when the formatted string has changed and when the keywords counts have changed in the content data since a previous one of the retrieval steps.

9. The method of claim 1 wherein, the content data is top level content data, the top level content data is a character string comprising text words and formatting characters and strings of spaces and links for linkage to linked content data, the linked content data also comprising text words and formatting characters and strings of spaces, the linked content data being at a linked depth from the top level content data for each linkage through a link to another one of the linked content data, the search criteria comprises a sleep interval indicating a time duration between the regular intervals and comprises keywords and comprises a crawling depth for retrieving the top level content data and linked content data to the linked depth of linked content data indicated by the crawling depth, the matches are keyword matches to the text words, the method further comprising the steps of, stripping the text words from the character string for the top level content data into a top level formatted string, determining a change in the top level formatted string since a previous one of the retrieval steps, storing the top level formatted string when there is a change in the top level formatted string since the previous one of the retrieval steps, determining a change in a number of keywords in the top level content data, the matching step matches the keywords to the text words in the top level formatted string, stripping the text words from the character string for the linked content data to the crawling depth, and counting the number of keywords in the formatted strings for the top level content data and the linked content data to the crawling depth when there is a change in the number of keyword matches in the top level content data for providing keyword counts, the reporting step reports the keywords counts.

10. The method of claim 1 wherein, the content data is top level content data, the top level content data is a character string comprising text words and formatting characters and strings of spaces and links for linkage to linked content data, the linked content data also comprising text words and formatting characters and strings of spaces, linked content data being at a linked depth from the top level content data for each linkage through a link to another one of the linked content data, the search criteria comprises a sleep interval indicating a time duration between the regular intervals and comprises keywords and comprises a Boolean expression and comprises a crawling depth for retrieving the top level content data and linked content data to the linked depth of linked content data indicated by the crawling depth, the matches are Boolean keyword matches of the Boolean expression and the keywords to the text words, the method further comprising the steps of, stripping the text words from the character string for the top level content data into a top level formatted string, determining a change in the top level formatted string since a previous one of the retrieval steps, storing the top level formatted string when there is a change in the top level formatted string since the previous one of the retrieval steps, determining a change in a number of keywords in the top level content data, the matching step matches the keywords to the text words in the top level formatted string, stripping the text words from the character string for the linked content data to the crawling depth, and counting the number of keywords in the formatted strings for the top level content data and the linked content data to the crawling depth when there is a change in the number of keyword matches in the top level content data for providing keyword counts, the reporting step reports the keywords counts.

11. A method of monitoring by a monitoring server web content data of a web server system among a plurality of web servers connected to a user system among plurality of user system having respective user browser, all of which are interconnected through the internet using internet protocol address, the web content indicated by a URL a portion of which indicates the web content of a web server system among a plurality of web servers connected to a user system among a plurality of user systems having respective user browsers, all of which are interconnected through the internet using internet protocol addresses, the web content data indicated by a URL a portion of which indicates the web server the method comprising the steps of receiving by the monitoring server search criteria from a user system for monitoring web content data of a web server system among a plurality of web servers connected to a user system among a plurality of user systems having respective user browsers, all of the servers and the browsers are interconnected through the internet using internet protocol addresses, the web content data being indicated by a URL, a portion of the URL indicating the web server, the search criteria comprises keywords and comprises a crawling depth for retrieving top level content data and linked content data to the linked depth of the linked content data indicated by the crawling depth, retrieving top level content data and the linked content data from the data system, the top level content data is a character string comprising text words and formatting characters and strings of spaces and links for linkage to linked content data, the linked content data also comprising text words and formatting characters and strings of spaces, determining matches when the top level content data matches the search criteria, and reporting the top level matches to the user system.

12. The method of claim 11, wherein the determining step further determines keyword matches to the linked content data.

13. The method of claim 11, wherein the determining step further determines keyword count of the keywords in the linked content data.

14. A method of monitoring by a monitoring server web content data of a web server system among a plurality of web servers connected to a user system among a plurality of user systems having respective user browsers, all of which are interconnected through the internet using internet protocol addresses, the web content data indicated by a URL a portion of which indicates the web server the method comprising the steps of, receiving search criteria from a user system, the search criteria comprising a URL to be monitored, a sleep interval, keywords and a Boolean expression, retrieving the web content data indicated by the URL from the web server, repeating the retrieving step at regular intervals indicated by the sleep interval, determining Boolean keyword matches of the web content data after the retrieving step for the Boolean expression and keywords, and reporting to the user system of the Boolean keyword matches the content data is top level content data, the top level content data is a character string comprising text words and formatting characters and strings of spaces and links for linkage to linked content data, the linked content data also comprising text words and formatting characters and strings of spaces, linked content data being at a linked depth from the top level content data for each linkage through a link to another one of the linked content data.

15. The method of claim 14 wherein, the search criteria comprises a sleep interval indicating a time duration between the regular intervals and comprises keywords and comprises a Boolean expression and comprises a crawling depth for retrieving the top level content data and linked content data to the linked depth of linked content data indicated by the crawling depth, the matches are Boolean keyword matches of the Boolean expression and the keywords to the text words, the method further comprising the steps of, stripping the text words from the character string for the top level content data into a top level formatted string, determining a change in the top level formatted string since a previous one of the retrieval steps, storing the top level formatted string when there is a change in the top level formatted string since the previous one of the retrieval steps, determining a change in a number of keywords in the top level content data, the matching step matches the keywords to the text words in the top level formatted string, stripping the text words from the character string for the linked content data to the crawling depth, and counting the number of keywords in the formatted strings for the top level content data and the linked content data to the crawling depth when there is a change in the number of keyword matches in the top level content data for providing keyword counts, the reporting step reports the keywords counts.

16. The method of claim 15 wherein the reporting step comprises the steps of, providing the user with a notification through the internet of keyword matches, storing keywords counts for the keywords for the respective top level web content data and the linked content data, receiving a display request from the user system through the internet, and communicating through the internet to the user system display data for displaying on the user system indication of the keyword counts.

17. The method of claim 15 wherein the formatting characters comprises HTML tag characters.

* * * * *